United States Patent [19]

Covington

[11] 4,308,746

[45] Jan. 5, 1982

[54] LIQUID PIPELINE LEAK DETECTION

[75] Inventor: Morris T. Covington, Houston, Tex.

[73] Assignee: Crutcher Resources Corporation, Houston, Tex.

[21] Appl. No.: 104,371

[22] Filed: Dec. 17, 1979

[51] Int. Cl.³ .............................................. G01M 3/00
[52] U.S. Cl. .................................. 73/40.5 R; 340/605
[58] Field of Search ................. 73/40, 40.5 R, 40.5 A, 73/49.1; 340/605; 364/510

[56] References Cited

U.S. PATENT DOCUMENTS

| 4,083,229 | 4/1978 | Anway | 73/40.5 A |
| 4,090,179 | 5/1978 | Hirano | 340/605 |
| 4,106,099 | 8/1978 | Elliott et al. | 364/510 |

OTHER PUBLICATIONS

"Network System Transient Calculations by Implicit Method" by Stoner, from Journal of the Society of Petroleum Engineers, pp. 356-362, 1971.

*Primary Examiner*—James J. Gill
*Attorney, Agent, or Firm*—Richards, Harris & Medlock

[57] ABSTRACT

The occurrence and magnitude of a leak in a pipeline are determined by sensing a product velocity, pressure and temperature at an upstream point of flow of a product of known composition in said pipeline and sensing product velocity, pressure and temperature at a downstream point in said pipeline.

The ambient temperature of the material surrounding said pipeline is sensed at spaced locations along said pipeline between said upstream and downstream points.

The above parameters are employed to determine from four equations (conservation of mass, conservation of momentum, conservation of energy, and the equation of state) a single valued function of time representative of the product imbalance of product flowing from said upstream point to said downstream point.

7 Claims, 1 Drawing Figure

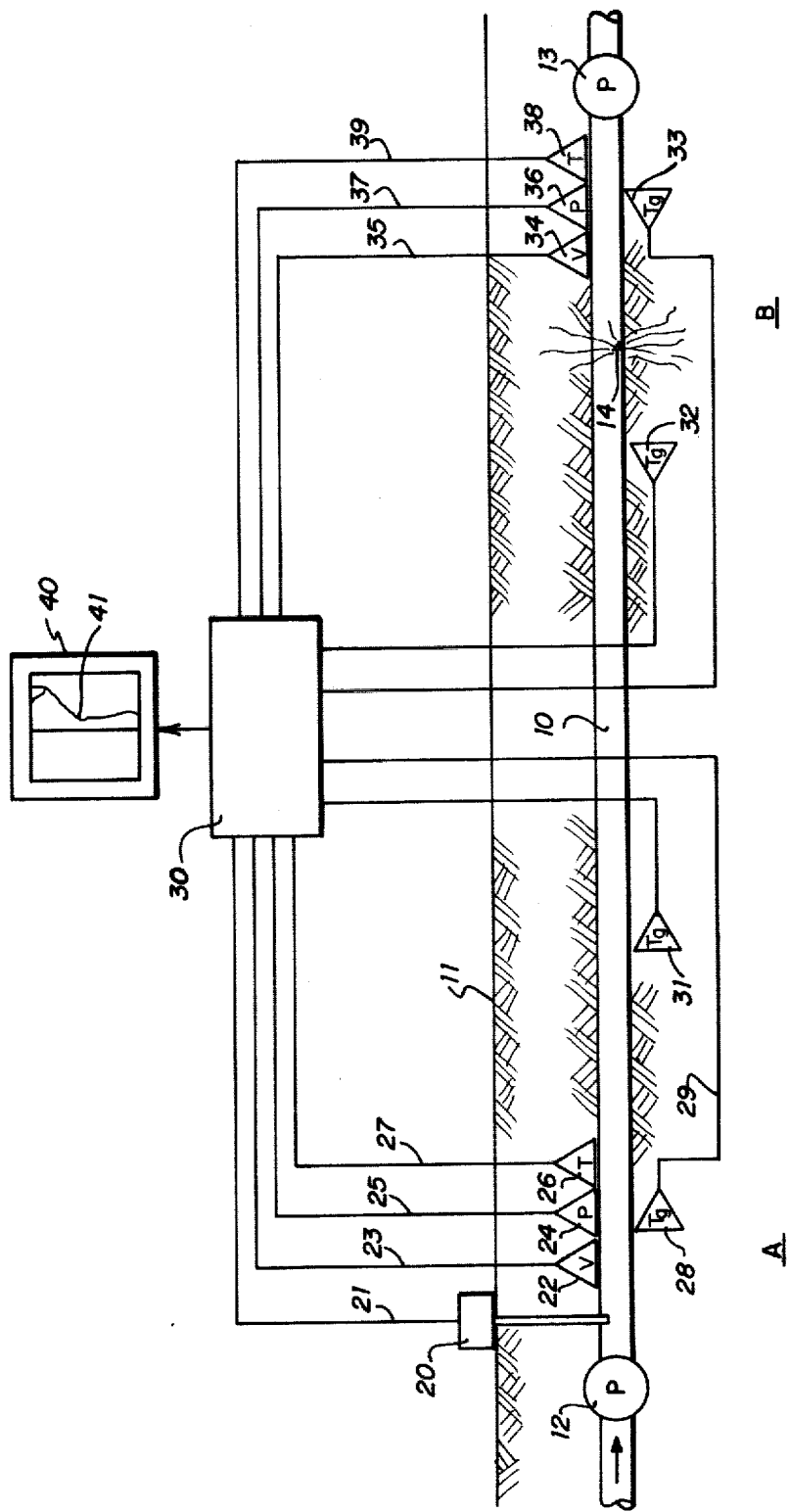

LIQUID PIPELINE LEAK DETECTION

TECHNICAL FIELD

This invention relates to operation of fluid carrying pipelines and more particularly to the rapid detection of the occurrance or existence and magnitude of a leak therein.

BACKGROUND ART

In the operation of pipelines through which fluids such as crude oil, refined products, natural gas and the like flow under pressure of pumping systems, it is highly desirable to be able to portray on real-time basis any loss of product that might occur through a rupture in the pipeline or through some other cause.

Heretofore there have been many attempts to detect such events in order to direct efforts to locate and repair pipeline leaks.

Heretofore attempts have been made to determine loss, utilizing pressure and flow velocity measured at two points along a pipeline. Such attempts are described in the following publications:

"Network System Transient Calculations by Implicit Method", M. A. Stoner, *Journal of the Society of Petroleum Engineers*, December 1971, pp. 352–365; and "Some Applications of Transient Flow Simulation", V. L. Streeter and E. B. Wylie, *Journal of the Society of Petroleum Engineers*, December 1978, pp. 357–364.

DISCLOSURE OF THE INVENTION

In accordance with the present invention, variable pipeline parameters are measured at two spaced points along the pipeline. Upstream, the variables are: (1) product velocity, (2) product pressure, (3) product temperature, and (4) product composition. At the downstream point, the variables are (1) product velocity, (2) pressure and (3) temperature. Further measurements are made at various points along the pipeline and between the upstream and downstream points of the temperature of the earth at the level at which the pipeline is buried, or in the case of surface pipelines, the temperature is determined on a continuing basis at spaced points.

Based upon the above parameters, a function is generated represented by the solution of four simultaneous equations.

The equations are:
1. conservation of mass equation,
2. conservation of momentum equation,
3. conservation of energy equation, and
4. the equation of state.

Any product imbalance is registered on a real-time basis and as a function of time. The plotted or registered function is established through optimizing the solutions in accordance with the finite difference explicit method which is well known. Integration steps are made as long as possible in terms of the nature of three variables: (1) product velocity, (2) pipeline size, and (3) the pipeline wall thickness.

More particularly, in accordance with the present invention, the occurrence and magnitude of a pipeline leak is determined by:
(a) sensing product velocity, pressure, and temperature of flow of product of known composition in said pipeline at an upstream point,
(b) sensing product velocity, pressure, and temperature at a downstream point in said pipeline,
(c) determining ground temperature at spaced locations between said upstream and downstream points,
(d) utilizing the measured parameters for the simultaneous solution of: (1) the conservation of mass equation, (2) the conservation of momentum equation, (3) conservation of energy equation, and (4) the equation of state for said pipeline with said product therein, and
(e) registering the product imbalance function resulting from repetitive solutions to said equations as function of time. The imbalance is equal to the product fed into the pipeline minus the product delivered from the pipeline minus the product packed into the pipeline. The imbalance appearing on a real-time chart will provide indicia as to the time occurrance and magnitude of a leak or rupture.

BRIEF DESCRIPTION OF DRAWINGS

FIG. 1 illustrates a pipeline system embodying the present invention.

DETAILED DESCRIPTION

Referring now to FIG. 1, a pipeline 10 is buried beneath the earth's surface 11 and extends from station A to station B. Stations A and B may be spaced apart many miles. Ordinarily they would be spaced in accordance with the locations of pumping stations. As shown in FIG. 1 a measuring unit 12 is located at station A and a measuring unit 13 is located at station B.

The present invention is directed to the determination of the occurrence and magnitude of a leak such as might occur at any point along line 10, such as at point 14. The product may be gas or liquids. It is desirable, as soon as possible after occurrence, that the existence of a leak is determined so that its location can then be established and corrective action taken.

In accordance with the present invention, a unique set of parameters of the line 10 and of the product in line 10 are utilized repetitively in order to provide a substantially continuous time function as to the magnitude of any product imbalance between the quantity leaving the station 12 and quantity arriving at pump station 13. This is accomplished in accordance with the present invention by utilizing the following measurements.

At station A an analyzer 20 is provided to indicate on the output channel 21 the density of the product in line 10. A sensor 22 is provided to indicate on channel 23 the velocity of the product in line 10 at station A. The sensor 24 provides an output on channel 25 indicative of the pressure in the product at station A and sensor 26 provides an input on channel 27 representative of the temperature of the product. A further sensor 28 provides an input on channel 29 indicating the temperature of the ground in the region of the pipeline 10. Input channels 21, 23, 25, 27 and 29 are connected to a processor 30.

Along line 10, ground temperature sensors 31 and 32 are located and are connected to processor 30. Sensors 31 and 32 are located at intermediate points along line 10.

At station B, a ground temperature sensor 33 is located. Also at station B is a sensor 34 which provides on channel 35 a signal representing the velocity of the product at station B. Sensor 36 provides on channel 37 a signal representing the pressure in the product at station B. Sensor 38 provides on channel 39 a signal representative of the temperature of the product at station B.

With the above variables applied to processor 30, four simultaneous equations are repeatedly solved to yield a single function solution which is plotted as a time dependent trace 41 on chart recorder 40. The trace 41 is the imbalance between the quantity of product at station A and the quantity of product delivered at station B.

If the nature of the product is known, the use of analyzer 20 is not necessary and a signal on channel 21 may be provided, on a suitable compatible scale, proportional to the density of the product.

Many types of transient flow conditions are possible in a system depending mainly upon its geometry and upon the cause of the transient. The unsteady flow can be of very extended duration as in starting up a long transmission system; its duration may be in the order of one day as in the supply to industrial, commercial or residential areas, or it may be short term, perhaps one hour in the case of unexpected mechanical failures or power shutdowns. Even faster transients become significant upon operation of relief valve mechanisms, or more importantly breaks or leaks on line 10.

CONTROLLING RELATIONSHIPS

Several physical equations used for steady and unsteady state analysis are set forth below in differential equation form:

(i) Conservation of Mass Equation $$\frac{\partial(\rho v)}{\partial x} + \dot{\rho} + \frac{\rho}{E}(\xi_2(2-\mu) + \xi_1(1-2\mu)) = 0$$

(ii) Conservation of Momentum Equation $$\frac{\partial(\rho v^2)}{\partial x} + \frac{\partial P}{\partial x} + \frac{fv|v|}{2D}\rho + \rho g \frac{\partial h}{\partial x} = -\frac{\partial(\rho v)}{\partial t}$$

(iii) Conservation of Energy Equation $$\frac{\partial}{\partial x}\left(\tfrac{1}{2}\rho v^3 A + \frac{\gamma}{\gamma-1}\frac{RT}{M}\rho v A + gh\rho v A + \right.$$

$$K(T - T_g)\pi D =$$

$$-\frac{\partial}{\partial t}\left(\tfrac{1}{2}\rho v^2 A + \frac{RT}{(\gamma-1)M}\rho A + \rho gh A\right)$$

(iv) The Equation of State $$P = \rho RT + \left(B_0 RT - A_0 - \frac{C_0}{T^2} + \frac{D_0}{T^3} - \frac{E_0}{T^4}\right)\rho^2$$

$$+ \left(bRT - a - \frac{d}{t}\right)\rho^3 + \alpha\left(a + \frac{d}{t}\right)\rho^6$$

$$+ \frac{c\rho^3}{T^2}(1 + \gamma\rho^2 \exp(-\gamma\rho^2))$$

| Where: | For Propane* | | For N-Butane* |
|---|---|---|---|
| $A_0$ = | 18,634.7 | = | 32,544.7 |
| $B_0$ = | .964762 | = | 1.56588 |
| $C_0$ = | 7.96178 × 10$^9$ | = | 1.37436 × 10$^{10}$ |
| $D_0$ = | 4.53708 × 10$^{11}$ | = | 3.33159 × 10$^{11}$ |
| $E_0$ = | 2.56053 × 10$^{13}$ | = | 2.30902 × 10$^{12}$ |
| a = | 4.00664 × 10$^4$ | = | 7.11818 × 10$^4$ |
| b = | 5.46248 | = | 9.14006 |
| c = | 2.74461 × 10$^{10}$ | = | 7.00044 × 10$^{10}$ |
| d = | 1.50520 × 10$^7$ | = | 3.64238 × 10$^7$ |
| α = | 2.01402 | = | 4.00985 |
| γ = | 4.56182 | = | 7.54122 |
| $\dot{\rho}$ | = $d\rho/dt$ | | |
| ρ | = density | | |
| v | = velocity | | |
| E | = wall elasticity | | |
| μ | = poisson's ratio = 1.33 | | |
| $\xi_1$ | = lateral stress tensor = 5/4 | | |
| $\xi_2$ | = hoop stress tensor = 7/3 | | |
| D | = density | | |
| g | = gravity | | |
| h | = elevation change | | |
| t | = time | | |
| A | = area | | |
| T | = temperature | | |
| $T_g$ | = ground temperature | | |
| R | = gas constant | | |
| M | = molecular weight | | |
| x | = distance along the pipeline | | |

*From Properties of Light Petroleum Fluids, Kenneth D. Starling, Gulf Publishing Co., 1972.

Within the equation of momentum, the frictional factor and elevation head terms are produced. Within the mass equation, pipewall deformation is accounted for. In the given form, the equations operate on four (4) variables, T, P, v, and ρ.

The mass and momentum equation contain no property of the product other than density. Thus the operation can be employed for any product, given that the density ρ can be produced for the product from an adequate equation of state.

An accurate equation of state ranging through the critical regions is employed so that the Joule-Thompson effect arises from a direct calculation of the energy flow. Heat conduction to and from the ground is included. Boundary conditions are pressure and temperature upstream and mass flow downstream, all of which can be varied linearly over selected time intervals. In actual operations, they are provided by the real-time data from instruments.

Frictional factor in the above equations is computed on an interval-by-interval basis, using the known Colebrook-White relation discussed in the *Proceedings of the Royal Society in London*, Serial A, Vol. 161, p. 367 (1973). Viscosity is computed using correlation such as the Dean and Stiel correlation discussed in "Viscosity of Non-Polar Gas Mixtures at Moderate and High Pressure", *Journal of American Institute of Chemical Engineers*, Vol. 11, p. 525, 1965.

More than one product in line 10, with a diffusive interface between them may be accommodated. The interface is treated as a sharp transition from one product to the other. An auxiliary routine determines the growth and shape of the interface due to turbulent diffusion. The sharp interface approximation is accurate if the length of the interface is small compared to the selected integration interval along the pipeline.

Useful operations are accurate, fast, flexible, and take every significant parameter into account. Such desirable properties are not necessarily compatible with each other or with a processor that may be available. The present operation reconciles these requirements as far as possible. Ultimately, decisions must be made as to what is most needed. Several methods, such as characteristics, exist for the numerical integration of simultaneous differential equations. The operation herein preferably uses a first order finite difference approach, with careful attention to the protocol of incrementing the various dependent variables. Finite difference integration is fast, simple and retains all the essential elements in a discernible form. It also tends to be very stable.

Accuracy and speed depend upon the size and distance steps. The nature of flow in pipelines is such that surprisingly long (miles) distance integration increments for integration give accurate results. This is important, because the integration time increment must be significantly less than the time required for an acoustic wave to travel down a distance increment or else instabilities become unmanageable. As a result, the time step employed is much less than would be needed for accuracy alone.

A fluid flows down a pipeline with its acceleration determined by the balance between pressure gradient and friction. Friction is usually expressed as some frictional factor multiplied by a function of velocity. The frictional factor itself is a slowly varying function of the fluid properties in the pipe. The work done on the fluid by the pressure gradient force goes into heat due to the friction. Since this work comes from enthalpy of the fluid, the flow would be isothermal, except for conduction to the ground and the Joule-Thompson effect. A pipeline may be thought of as a long porous plug. Because many products are pumped at near critical regions, an adequate equation of state, both to relate state variables and permit determination of thermodynamic functions at high speeds, is most difficult.

Leaks have been heretofore detected externally by observing some effect of the escaping product, or internally by observation of the product loss. Although chemical detection is extraordinarily sensitive, the cost of continual sampling along a pipeline has been limited generally to the observation of dead vegetation. Loss of product can be observed by monitoring mass flow at two stations. However, without an accurate transient dependent operation to represent the fluctuating line pack, hours are required to detect 10% leaks and days are required to detect 1% leaks. The present transient dependent operation in real-time, with boundary conditions supplied and updated from pipeline instrumentation and supervisory control systems, permits the identification of leaks within the resolution of the instruments (typically 1%) in the time required for the effects of the leak to propagate to the instruments.

Transient responsive operations are herein made available with greater flexibility so that most pipeline operations can be simulated with speed to permit operational use in real-time. The product properties which are important in lighter products, particularly in the transition through the critical region, is handled by an equation of state covering a wide range. The operation, once tuned to the pipeline with adequate instrumentation, permits rapid identification of leaks and improper conditions. In one embodiment of the computer program for use in the system of FIG. 1 was as set out in Table I.

TABLE I

```
C      DYNAME, FR.
C      ** THIS SUBROUTINE PERFORMS THE DYNAMIC GAS MODEL ON
C      ** A SINGLE PIPELINE SEGMENT
C      ** <THIS VERSION DOES NOT SUPPORT INTERFACES>
C      **
C      **
C      ** THE VARIABLES UPON ENTRY:
C      ** PRODUCT        (PRODUCT ID) - THE ID OF THE PRODUCT ON THE HEAD OF
C      **                THE SEGMENT
C      ** FRFACT         (FRICTION FACTOR) - THE FRICTION FACTOR OF THE PRODUCT
C      **                IN THE HEAD OF THE SEGMENT
C      **
C—
       SUBROUTINE DYNAM (SEGNUM)
       COMMON/PIPE1/PRS(40),TEM(40),DEN(40),VEL(40)
       COMMON/PIPE2/MIL(40),GTM(40),HLC(40),GRV(40)
       COMMON/CONFG/HEAD(10),TAIL(10),SUCT(10),TLOC(10)
       COMMON/SEGDX/LEN(10)
       COMMON/CONS1/FOURODIAM,TWODI
       COMMON/DUNKP/ITNUM,PRODUCT,FRFACT,KOKMI,MOLWTI,KMIMI
       COMMON/PARMS/DT,NUMOFSEGS
       DIMENSION DELTAV(40),DELTAD(40),DELTAT(40)
       REAL LEN,MIL,MOLWT,MOLWTI,KOKMI,KMIMI
       INTEGER HEAD,TAIL,SUCT,TLOC
       INTEGER START,STOP,SEGNUM,PRODUCT
C      **
       PARAMETER R = 49706.5              ; = 32.17 * 10.73 * 144.0
       PARAMETER G = 32.17
C      **
       DELTAXI = 1.0/LEN(SEGNUM)          ; GET SEGMENT'S INTERVAL LEN.
C      **
C      ** SET THE ABSOLUTE INTEGRATION LIMITS FOR THIS SEGMENT
C      **
10     START = HEAD(SEGNUM)               ; GET THE FIRST INTERVAL
       STOP = TAIL(SEGNUM)                ; GET THE LAST INTERVAL NUMBER
C      **
C      ** NOW ESTABLISH THE VELOCITY PROFILE USING A FORWARD STEP OF
C      ** THE CONVERSATION OF MOMENTUM EQUATION
C      **
       J = 0                              ; DELTAV ARRAY INDEX
       DO 100 I = START,STOP — 1
       J = J + 1
       DELTAV(J) = ((VEL(I)*(VEL(I) — VEL(I + 1)) + (PRS(I) — PRS(I + 1))/DEN(I)
     & + (GRV(I) — GRV(I + 1)))*DELTAXI — FRFACT*VEL(I)*ABS(VEL(I))*TWODI) *DT
       VEL(I) = VEL(I) + DELTAV(J)
100    CONTINUE
       DELTAV(J + 1) = 0.0                ; A BOUNDARY CONDITION
C      **
C      ** NOW USE THE GAS ENERGY EQUATIONS TO DETERMINE THE INTERVAL
C      ** TEMPERATURE PROFILES.
C      **
       J = 1                              ; DELTA ARRAYS INDEX
```

TABLE I-continued

```
C      **
C      ** COMPUTE THE (I - 1) TERM TO START THINGS OFF
C      **
       I = START
       H = KOKMI*R*TEM(I)*MOLWTI
       TERM2 = DEN(I)*VEL*(0.5*VEL(I)*VEL(I) + H
     & + GRV(I) + G*ENTHD(DEN(I),TEM(I),PRODUCT)*MOLWTI)
C      **
C      ** THIS IS THE MAIN INTEGRATION LOOP
C      **
       DO 250 I = START + 1,STOP
       J = J + 1                         ; DELTA ARRAYS INDEX
C      **
C      ** COMPUTE THE NEW DENSITY FOR THIS INTERVAL
C      **
       DELTAD(J) = (DEN(I - 1)*VEL(I - 1) - DEN(I)*VEL(I))*DELTAXI*DT
C      **
C      ** COMPUTE THE VARIOUS TERMS OF THE ENERGY EQUATION.
C      ** NOTE THE THE (I - 1) TERM HAS BEEN SAVED FROM THE PREVIOUS STEP.
C      **
       TERM1 = TERM2                     ; FROM THE PREVIOUS STEP
       H = KOKMI*R*TEM(I)*MOLWTI
       TERM2 = DEN(I)*VEL(I)*(0.5*VEL(I)*VEL(I) + H
     & + GRV(I) + G*ENTHD(DEN(I),TEM(I),PRODUCT)*MOWLTI)
       TERM3 = HLC(I)*(GTM(I) - TEM(I))*FOURODIAM
       U = H - PRS(I)/DEN(I)
       TERM4 = 0.5*DEN(I)*VEL(I)*DELTAV(J) + (0.5*VEL(I)*VEL(I)
     & + U + G*ENGD(DEN(I),TEM(I),PRODUCT)*MOLWTI)*DELTAD(J)
       TERM5 = (U/TEM(I) + G*SPHD(DEN(I),TEM(I),PRODUCT)*MOLWTI)*DEN(I)
       DELTAT(J) = (((TERM1 - TERM2)*DELTAXI + TERM3)*DT - TERM4)/TERM5
C      **
250    CONTINUE
C      **
C      ** NOW IT IS TIME TO ADJUST THE DENSITIES AND TEMPERATURES TO REFLECT
C      ** THE INCREMENTS JUST COMPUTED. (NOTE THAT PRESSURE IS COMPUTED FROM
C      ** THE EQUATION OF STATE)
C      **
       J = 1
       DO 450 I = START + 1,STOP
       J = J + 1
       DEN(I) = DEN(I) + DELTAD(J)
       TEM(I) = TEM(I) + DELTAT(J)
       PRS(I) = STARL(DEN(I),TEM(I))
450    CONTINUE
C      **
       RETURN
C      **
       END
```

I claim:

1. The method of determining the occurrence and magnitude of a leak in a pipeline which comprises:
   (a) continuously sensing pipeline parameters including product velocity, pressure and temperature at an upstream point of flow of a product of known composition in said pipeline;
   (b) continuously sensing pipeline parameters including product velocity, pressure and temperature at a downstream point in said pipeline;
   (c) determining the ambient temperature parameter of the material surrounding said pipeline;
   (d) plotting as a single valued function of time the mass flow into the pipeline at said upstream point minus mass flow out of the pipeline at said downstream point minus the line pack of product in the pipeline between said points by repeated application of said parameters to simultaneous equations (1) conservation of mass equation, (2) conservation of momentum equation, (3) conservation of energy equation, and (4) the equation of state whereby any product imbalance of product flowing from said upstream point to said downstream point will be evident from the plot of said function of time.

2. The method of determining the occurrence and magnitude of a leak in a pipeline which comprises:

continuously sensing pipeline parameters of product velocity, pressure and temperature at an upstream point of flow of said product of known composition in said pipeline;

continuously sensing pipeline parameters of product velocity, pressure and temperature at a downstream point in said pipeline;

continuously sensing the ambient temperature of the material surrounding said pipeline at spaced locations along said pipeline between said upstream and downstream points;

utilizing the sensed parameters in the equations, (1) conservation of mass, (2) conservation of momentum, (3) conservation of energy, and (4) of state; and continuously registering a single valued function of time representative of any imbalance of product flowing from said upstream point to said downstream point in dependence upon the effect of said product.

3. The method of determining the occurrence and magnitude of a leak in a pipeline which comprises:
   (a) sensing a product velocity, pressure and temperature at an upstream point of flow of a product of known composition in said pipeline;

(b) sensing product velocity, pressure and temperature at a downstream point in said pipeline;

(c) determining the ambient temperature of the material surrounding said pipeline at spaced locations along said pipeline between said upstream and downstream points;

(d) repeatedly utilizing the parameters from steps a–c in solving the simultaneous equations: (1) conservation of mass, (2) conservation of momentum, (3) conservation of energy, and (4) of state; and (e) plotting as a single valued function of time the mass flow into the pipe minus the mass flow out of the pipe minus the line pack of product in the pipe, the latter involving the density of the product in said line from the solution to said equations thereby to indicate any imbalance of product flowing from said upstream point to said downstream point.

4. The method of determining the occurrence and magnitude of a leak in a pipeline which comprises:

sensing pipeline product velocity, pressure and temperature at an upstream point of flow of said product of known composition in said pipeline;

sensing product velocity, pressure and temperature at a downstream point in said pipeline;

sensing the ambient temperature of the material surrounding said pipeline at spaced locations along said pipeline between said upstream and downstream points;

utilizing the sensed parameters to generate an output signal representative of the solution of four equations (1) conservation of mass, (2) conservation of momentum, (3) conservation of energy, and (4) the equation of state as a single valued signal varying with time to represent any imbalance of product flowing from said upstream point to said downstream point.

5. A system for portraying a signal representative of the occurrence and magnitude of a leak in a pipeline which comprises:

(a) means for producing continuous signals representing product velocity, pressure and temperature at an upstream point of flow of a product of known composition in said pipeline;

(b) means for producing continuous signals representing product velocity, pressure and temperature at a downstream point in said pipeline;

(c) means to product signals representative of the ambient temperature of the material surrounding said pipeline at spaced locations along said pipeline between said upstream and downstream points;

(d) means for utilizing said signals repeatedly to generate an output signal representative of the solution to the simultaneous equations (1) conservation of mass, (2) conservation of momentum, (3) conservation of energy, and (4) of state; and (e) means for registering said output signal as a single valued function of time thereby to portray any product imbalance of product flowing from said upstream point to said downstream point.

6. A system for portraying the occurrence and magnitude of a leak in a pipeline which comprises:

a means for continuously sensing pipeline parameters consisting of product velocity, pressure and temperature at an upstream flow point of a product of known composition;

means for continuously sensing pipeline parameters consisting of product velocity, pressure and temperature at a downstream point in said pipeline;

means for continuously sensing the ambient temperature of the material surrounding said pipeline at spaced locations along said pipeline between said upstream and downstream points;

means for utilizing said parameters in the simultaneous equations of conservation of mass, conservation of momentum, conservation of energy, and of state; and means for continuously registering a single valued function of time representative of any imbalance of product flowing from said upstream point to said downstream point in dependence upon the effect of said product.

7. A system for determining the occurrence and magnitude of a leak in a pipeline which comprises:

(a) means for continuously sensing the pipeline parameters of product velocity, pressure and temperature at an upstream point of flow of a product of known composition in said pipeline;

(b) means for continuously sensing the pipeline parameters of product velocity, pressure and temperature at a downstream point in said pipeline;

(c) means for determining the ambient temperature parameter of the material surrounding said pipeline;

(d) means responsive to repeated use of said parameters in simultaneous equations for (1) conservation of mass, (2) conservation of momentum, (3) conservation of energy, and (4) of state for registering as a single valued function of time the mass flow into the pipeline at said upstream point minus mass flow out of the pipeline at said downstream point minus the product packed in said pipeline between said points whereby any product imbalance of product flowing from said upstream point to said downstream point will be evident from a change in said function.

* * * * *